(12) United States Patent
Donadel et al.

(10) Patent No.: US 8,820,136 B2
(45) Date of Patent: *Sep. 2, 2014

(54) MICROELECTROMECHANICAL GYROSCOPE WITH CONTINUOUS SELF-TEST FUNCTION

(71) Applicant: STMicroelectronics S.r.l., Agrate Brianza (IT)

(72) Inventors: Andrea Donadel, Meda (IT); Luciano Prandi, Bellinzago Novarese (IT); Carlo Caminada, Pregnana Milanese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/890,991

(22) Filed: May 9, 2013

(65) Prior Publication Data

US 2013/0239651 A1    Sep. 19, 2013

Related U.S. Application Data

(63) Continuation of application No. 12/973,636, filed on Dec. 20, 2010, now Pat. No. 8,459,093.

(30) Foreign Application Priority Data

Dec. 21, 2009   (IT) ............................... TO2009A1019

(51) Int. Cl.
*G01C 19/56* (2012.01)

(52) U.S. Cl.
USPC ........................................ 73/1.37; 73/504.12

(58) Field of Classification Search
USPC ............................................. 73/1.37, 504.12
See application file for complete search history.

(56) References Cited

U.S. PATENT DOCUMENTS

| | | | |
|---|---|---|---|
| 5,351,519 A | 10/1994 | Kress | |
| 6,029,516 A | 2/2000 | Mori et al. | |
| 6,427,518 B1 | 8/2002 | Miekley et al. | |
| 6,564,637 B1 | 5/2003 | Schalk et al. | |
| 7,086,270 B2 | 8/2006 | Weinberg et al. | |
| 7,694,563 B2 | 4/2010 | Durante et al. | |
| 2005/0268716 A1 | 12/2005 | Hrovat et al. | |
| 2007/0214883 A1 | 9/2007 | Durante et al. | |
| 2008/0190199 A1 | 8/2008 | Prandi et al. | |

FOREIGN PATENT DOCUMENTS

| | | |
|---|---|---|
| EP | 1 832 841 A1 | 9/2007 |
| WO | 2007/105211 A2 | 9/2007 |

*Primary Examiner* — John Chapman, Jr.
(74) *Attorney, Agent, or Firm* — Seed IP Law Group PLLC

(57) ABSTRACT

A microelectromechanical gyroscope includes a body and a sensing mass, which is movable with a degree of freedom in response to rotations of the body about an axis. A self-test actuator is capacitively coupled to the sensing mass for supplying a self-test signal. The capacitive coupling causes, in response to the self-test signal, electrostatic forces that are able to move the sensing mass in accordance with the degree of freedom at an actuation frequency. A sensing device detects transduction signals indicating displacements of the sensing mass in accordance with the degree of freedom. The sensing device is configured for discriminating, in the transduction signals, spectral components that are correlated to the actuation frequency and indicate the movement of the sensing mass as a result of the self-test signal.

14 Claims, 6 Drawing Sheets

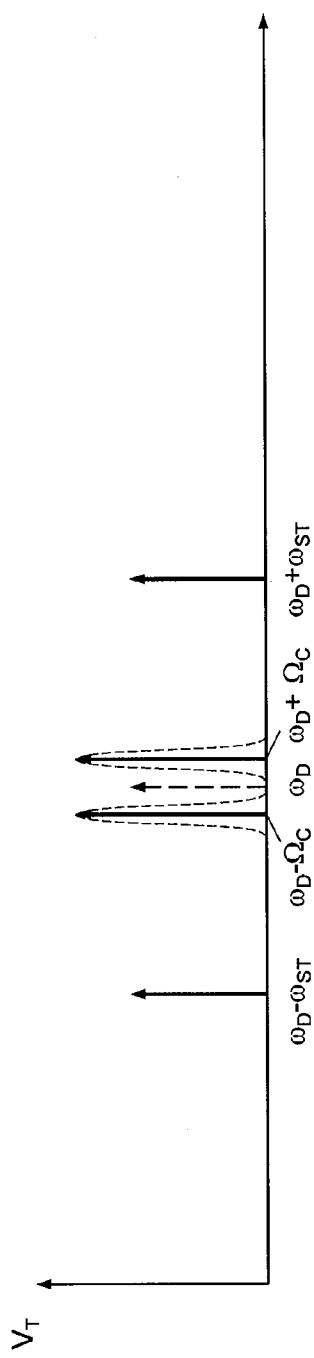
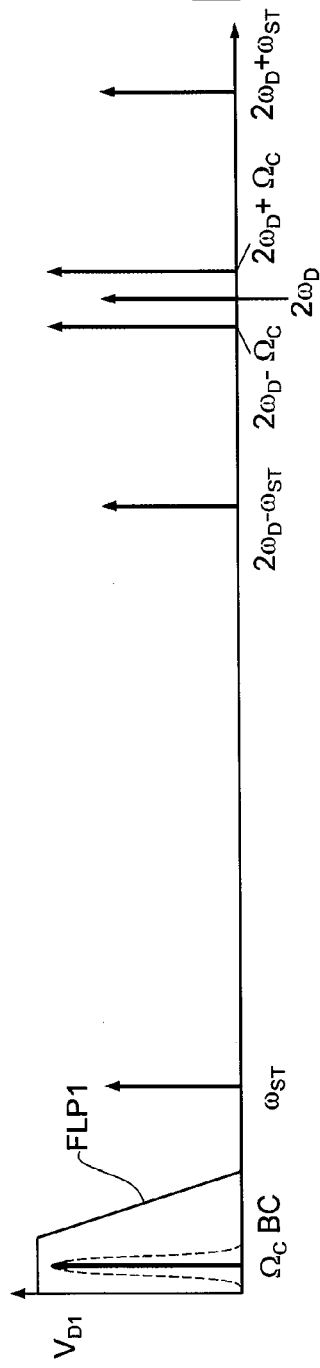
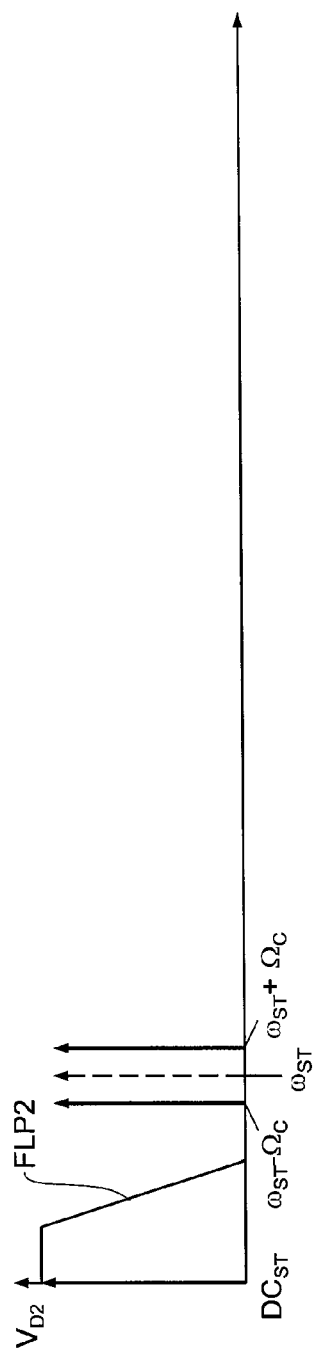

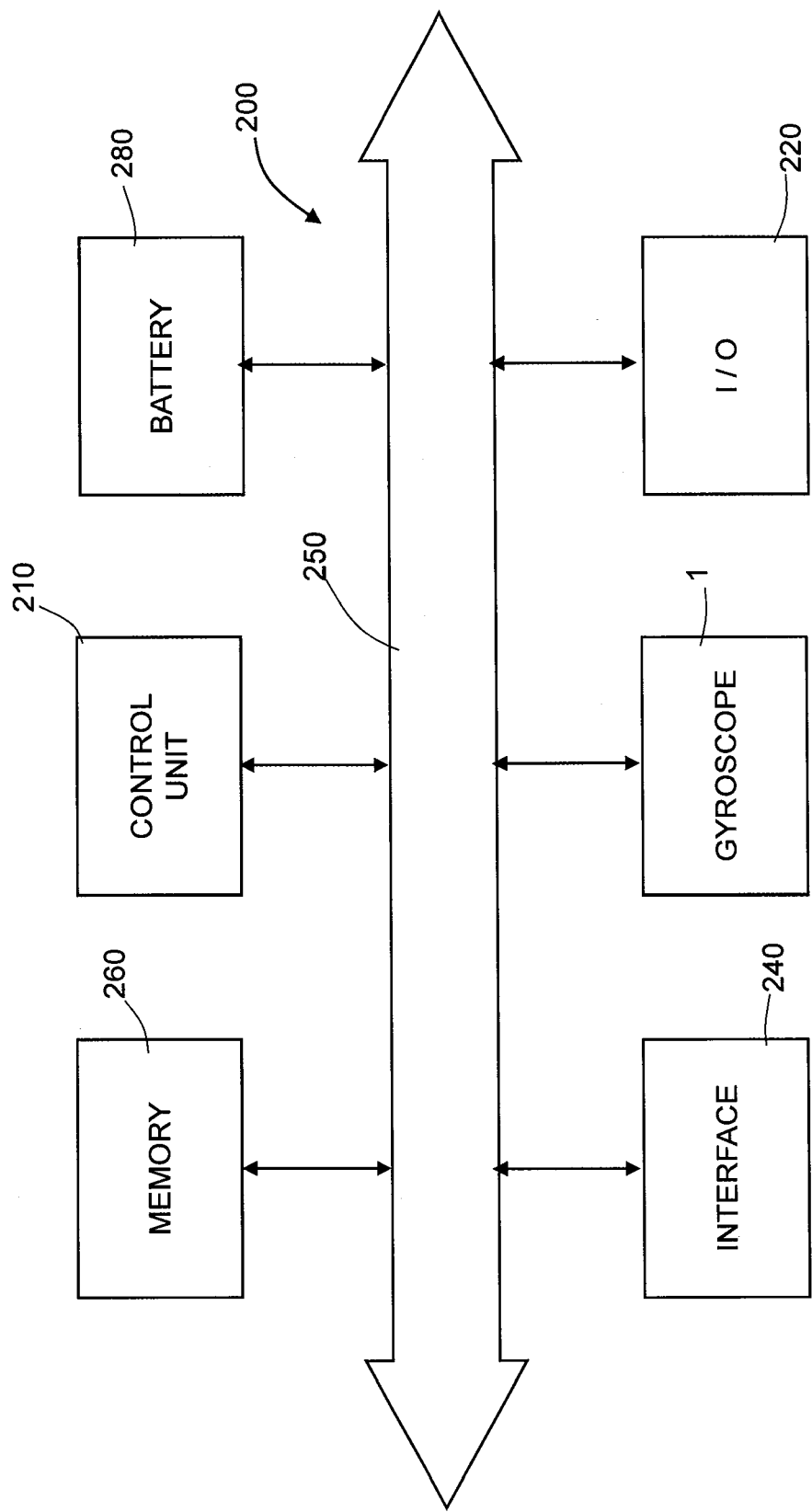

MICROELECTROMECHANICAL GYROSCOPE WITH CONTINUOUS SELF-TEST FUNCTION

BACKGROUND

1. Technical Field

The present invention relates to a microelectromechanical gyroscope with continuous self-test function, and to a method for controlling a microelectromechanical gyroscope.

2. Description of the Related Art

As is known, the use of microelectromechanical systems (MEMS) has increasingly spread in various technological sectors and has yielded encouraging results especially in providing inertial sensors, micro-integrated gyroscopes, and electromechanical oscillators for a wide range of applications.

MEMS systems of this type are usually based upon microelectromechanical structures comprising at least one mass, connected to a fixed body (stator) through springs and movable with respect to the stator according to pre-set degrees of freedom. The movable mass and the stator are capacitively coupled through a plurality of respective comb-fingered and mutually facing electrodes so as to form capacitors. The movement of the movable mass with respect to the stator, for example on account of an external stress, modifies the capacitance of the capacitors, whence it is possible to trace back to the relative displacement of the movable mass with respect to the fixed body and consequently to the force applied. Instead, by supplying appropriate biasing voltages, it is possible to apply an electrostatic force to the movable mass for setting it in motion. In addition, for providing electromechanical oscillators, the frequency response of MEMS inertial structures is exploited, which is typically of a second-order low-pass type, with one resonant frequency.

In particular, MEMS gyroscopes have a more complex electromechanical structure, which comprises two masses that are movable with respect to the stator and are coupled to one another so as to have a relative degree of freedom. The two movable masses are both capacitively coupled to the stator. One of the masses is dedicated to driving and is kept in oscillation at the resonant frequency. The other mass is driven in (translational or rotational) oscillatory motion and, in the event of rotation of the microstructure with respect to a pre-determined gyroscopic axis with an angular velocity, is subject to a Coriolis force proportional to the angular velocity itself. In practice, the driven mass, which is capacitively coupled to the fixed body through electrodes, as likewise the driving mass, operates as an accelerometer that enables detection of the Coriolis force and acceleration and hence of the angular velocity.

As practically any other device, MEMS gyroscopes are subject to production defects (which can regard the entire microstructure and the electronics) and wear, which can reduce the reliability thereof or jeopardize their operation completely.

For this reason, prior to being installed, gyroscopes undergo testing in the factory for proper operation, which enables identification and rejection of faulty examples.

In many cases, however, it is important to be able to carry out sampled checks at any stage of the life of the gyroscope, after its installation. In addition to the fact that, in general, it is advantageous be able to locate components affected by faults, to proceed to their replacement, MEMS gyroscopes are used also in critical applications, where any malfunctioning may have disastrous consequences. Just to provide an example, in the automotive sector the activation of many air-bag systems is based upon the response provided by gyroscopes. It is thus evident how important it is to be able to equip MEMS gyroscopes with devices that are able to carry out frequent tests on proper operation.

It should moreover be noted that the circuits for testing do not have to affect significantly the overall dimensions and the consumption levels, which assume increasing importance in a large number of applications.

In this connection, solutions have been developed that enable execution of in-field tests for proper operation in given conditions. According to known solutions, in particular, a self-test signal is generated starting from driving signals used for keeping the driving mass in oscillatory motion. The self-test signal is synchronous with the oscillations of the driving mass and is supplied to electrodes for self-testing of the sensing mass, which are configured so as to apply electrostatic forces to the sensing mass in the sensing direction, in response to the self-test signal. In practice, then, the self-test signal causes an effect that is altogether similar to that of a rotation of the microstructure about the gyroscopic axis. The amplitude of the self-test signal is known. In conditions of absence of any rotation of the microstructure, it is hence possible to detect the response of the gyroscope and, by comparing it with an expected response, determine whether the gyroscope functions properly or whether any malfunctioning has arisen.

BRIEF SUMMARY

It is noted that the known self-test process described above requires that the gyroscope be at rest, which is often impractical or even impossible, and that the self-test function cannot be exploited continuously or simultaneously with normal operation.

According to one embodiment, a device is provided that includes a microelectromechanical gyroscope having a body, a driving mass movably coupled to the body, and a sensing mass movably coupled to the driving mass. An actuator is provided, configured to apply a biasing force to the sensing mass to introduce a corresponding motion to the sensing mass relative to the driving mass. A sensing device is configured to detect motion of the sensing mass and to distinguish in the detected motion a component corresponding to motion of the body from a component corresponding to motion of the sensing mass introduced by the biasing force applied by the actuator. The sensing device is capacitively coupled to the sensing body, and is configured to detect differential changes in the capacitive coupling arising in response to motion of the sensing mass and to produce a corresponding first signal.

The sensing device can include demodulators configured to extract, from the first signal, a second signal corresponding to the motion of the body, and the second demodulator configured to extract, from the second signal, a third signal corresponding to motion of the sensing mass introduced by the biasing force applied by the actuator. Detection of the third signal at an appropriate amplitude is indicative of proper function of the gyroscope.

According to an embodiment, the sensing mass is one of a plurality of sensing masses, each movably coupled to the driving mass according to a respective axis of freedom, and the actuator is configured to apply a biasing force to each of the plurality of sensing masses to introduce a corresponding motion to each sensing mass according to the respective axis of freedom. The sensing device is configured to detect motion of each of the sensing masses according to the respective axis of freedom and to distinguish in the detected motion a component corresponding to motion of the body in a corresponding one of a plurality of axes of detection from a component corresponding to motion of the respective sensing mass introduced by the biasing force applied by the actuator.

According to respective embodiments, the device is a palm-top computer, a laptop computer, a cell phone, a messaging device, a digital music player, and a digital camera, each of which incorporates the gyroscope to detect movement of the device.

According to an embodiment, a method for testing the operation of a microelectromechanical gyroscope is provided, including introducing a first signal to a sensing mass that is movably coupled to a body of the gyroscope, detecting a second signal corresponding to movement of the sensing mass according to a degree of freedom, and separating from the second signal a third signal corresponding to movement of the body according to a sensing axis of the gyroscope and a fourth signal corresponding to movement of the sensing mass in response to introduction of the first signal. The first signal can be introduced by modulating a fifth signal having a frequency equal to a drive frequency of the sensing mass with a sixth signal having a frequency lower than the drive frequency, to produce the first signal, and introducing the resulting first signal to the sensing mass.

Separating the third and fourth signals from the second signal can include demodulating the second signal with a seventh signal having a frequency equal to the drive frequency, to produce a first demodulated signal, and filtering the first demodulated signal to derive the third signal; and demodulating the first demodulated signal with an eighth signal having a frequency equal to the frequency of the sixth signal, to produce a second demodulated signal, and filtering the second demodulated signal to derive the fourth signal.

Proper function of the gyroscope can be determined on the basis of an amplitude of the fourth signal, with respect to a reference value.

BRIEF DESCRIPTION OF THE SEVERAL VIEWS OF THE DRAWINGS

For a better understanding of the invention, some embodiments thereof will now be described, purely by way of non-limiting example and with reference to the attached drawings, wherein:

FIGS. 4a-4c are graphs regarding quantities used in the gyroscope of FIG. 1;

FIG. 7 is a simplified block diagram of an electronic system incorporating a microelectronic device according to one embodiment of the present invention.

DETAILED DESCRIPTION

Figure 1:
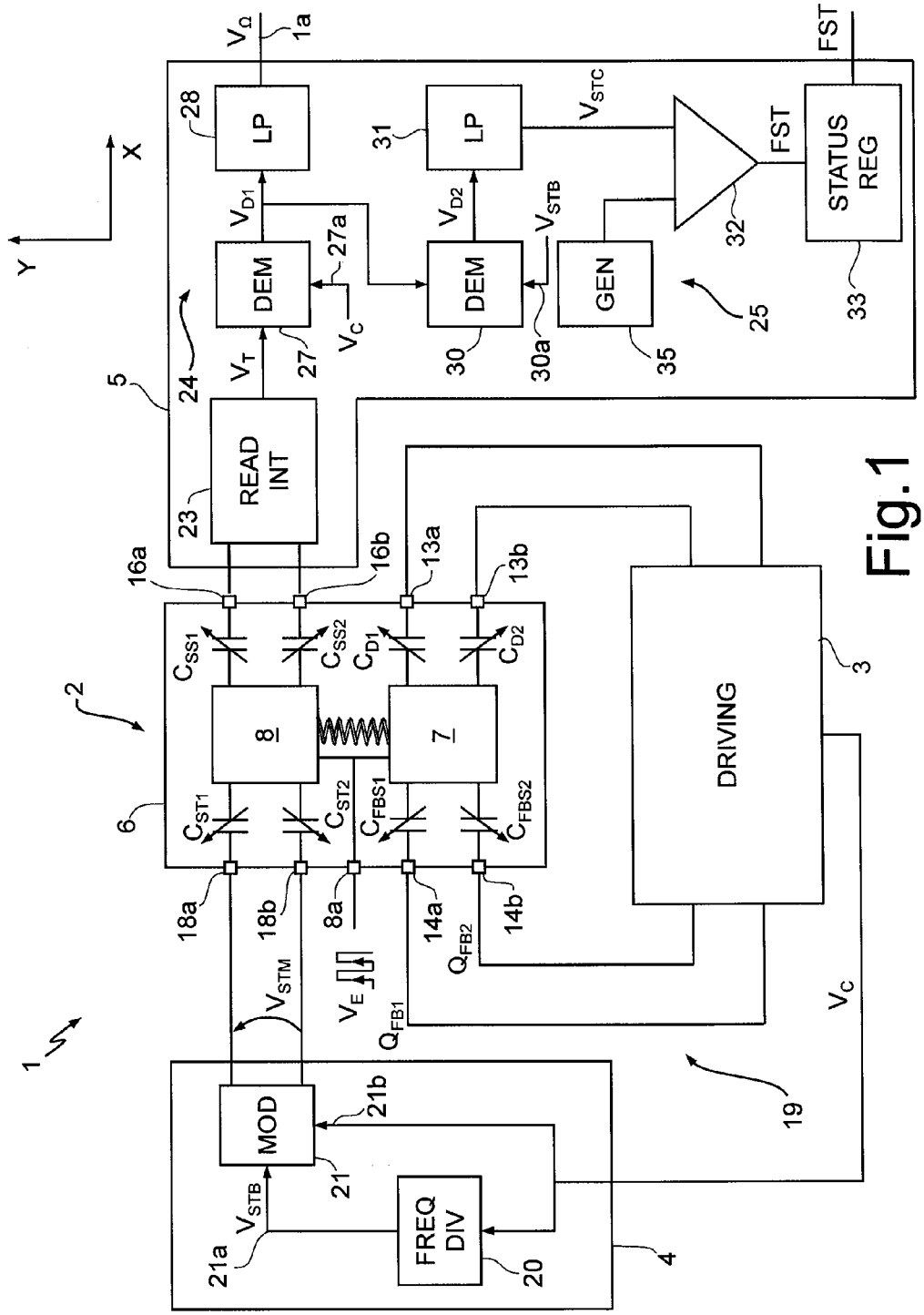
FIG. 1 is a simplified block diagram of a microelectromechanical gyroscope in accordance with a first embodiment of the present invention.

FIG. 1 is a schematic illustration of a microelectromechanical gyroscope 1, which comprises a microstructure 2, made of semiconductor material, a driving device 3, a self-test actuator 4, and a sensing device 5.

The microstructure 2 is made of semiconductor material and comprises a fixed structure 6, a driving mass 7, and at least one sensing mass 8. For reasons of simplicity, in the embodiment illustrated herein reference will be made to the case of a uniaxial gyroscope, in which only one sensing mass 8 is present. The ensuing description applies, however, also to the case of multiaxial gyroscopes, which comprise two or more sensing masses for detecting rotations according to respective independent axes.

The driving mass 7 is elastically connected by suspensions (not shown) to the fixed structure 6 so as to be oscillatable about a rest position according to a translational or rotational degree of freedom.

The sensing mass 8 is mechanically coupled to the driving mass 7 so as to be driven in motion according to the degree of freedom of the driving mass 7 itself. In addition, the sensing mass 8 is elastically connected to the driving mass 7 so as to oscillate in turn with respect to the driving mass 7 itself, with a respective further translational or rotational degree of freedom. In the embodiment described herein, in particular, the driving mass 7 is linearly movable along a driving axis X, whilst the sensing mass 8 is movable with respect to the driving mass 7 according to a sensing axis Y perpendicular to the driving axis X. It is understood, however, that the type of movement (whether translational or rotational) allowed by the degrees of freedom and the arrangement of the driving and sensing axes can vary according to the type of gyroscope. With reference to the movements of the driving mass 7 and of the sensing mass 8, moreover, either of the expressions "according to an axis" and "in accordance with an axis" can be understood as indicating movements along an axis or about an axis, according to whether the movements allowed to the masses by the respective degrees of freedom of a particular device are translational or else rotational, respectively. Likewise, either of the expressions "according to a degree of freedom" and "in accordance with a degree of freedom" can be understood as indicating either translational or rotational movements, as allowed by the degree of freedom itself.

In addition, the driving mass 7 (with the sensing mass 8) is connected to the fixed structure 6 so as to define a resonant mechanical system with a resonant frequency $\omega_R$ (according to the driving axis X).

The driving mass 7 (FIG. 2) is capacitively coupled to the fixed structure 6 by driving units 10 and feedback sensing units 12. The capacitive coupling is preferably of a differential type.

In greater detail, the driving units 10 comprise first and second fixed driving electrodes 10a, 10b, anchored to the fixed structure 6 and extending substantially perpendicular to the driving direction X, and movable driving electrodes 10c, anchored to the driving mass 7 and arranged also substantially perpendicular to the driving direction X. The movable driving electrodes 10c are comb-fingered and capacitively coupled to respective first fixed driving electrodes 10a and second fixed driving electrodes 10b. In addition, the first and second fixed driving electrodes 10a, 10b of the driving units 10 are electrically connected, respectively, to a first driving terminal 13a and to a second driving terminal 13b of the microstructure 2. As already mentioned, moreover, the coupling is of a differential type. In other words, in each driving unit 10 a movement of the driving mass 7 along the driving axis X produces an increase in the capacitance between each movable driving electrode 10c and one of the corresponding fixed driving electrodes 10a, 10b, while the capacitance between the respective movable driving electrode 10c and the other of the corresponding fixed driving electrodes 10a, 10b decreases, accordingly.

The structure of the feedback sensing units 12 is similar to that of the driving units 10. In particular, the feedback sensing units 12 comprise first and second fixed sensing electrodes 12a, 12b, anchored to the fixed structure 6, and first movable sensing electrodes 12c, anchored to the driving mass 7 and comb-fingered and capacitively coupled to respective first fixed sensing electrodes 12a and second fixed sensing electrodes 12b. In addition, the first and second fixed sensing electrodes 12a, 12b of the feedback sensing units 12 are electrically connected, respectively, to a first feedback sensing terminal 14a and to a second feedback sensing terminal 14b of the microstructure 2.

Figure 3:
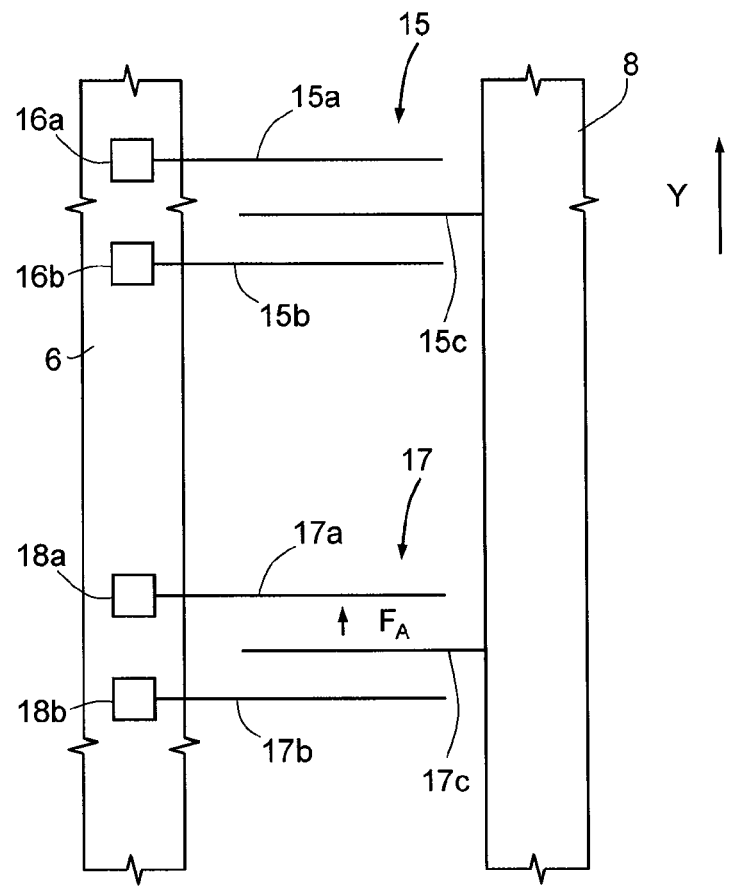
FIG. 3 is a simplified top plan view of a further enlarged detail of the device of FIG. 1.

The sensing mass 8 is capacitively coupled to the fixed structure 6 through signal sensing units 15 (FIG. 3) and self-test actuation units 17. More precisely, the signal sensing units 15 comprise third and fourth fixed sensing electrodes 15a, 15b, anchored to the fixed structure 6, and second movable sensing electrodes 15c, anchored to the sensing mass 8 and set between respective third fixed sensing electrodes 15a and fourth fixed sensing electrodes 15b. In addition, the third and fourth fixed sensing electrodes 15a, 15b of the signal sensing units 15 are electrically connected, respectively, to a first signal sensing terminal 16a and to a second signal sensing terminal 16b of the microstructure 2.

The self-test actuation units 17 comprise first and second fixed self-test electrodes 17a, 17b, anchored to the fixed structure 6, and movable self-test electrodes 17c, anchored to the sensing mass 8 and set between respective first fixed sensing electrodes 17a and second fixed sensing electrodes 17b. In addition, the first and second fixed self-test electrodes 17a, 17b of the self-test sensing units 17 are electrically connected, respectively, to a first self-test terminal 18a and to a second self-test terminal 18b of the microstructure 2.

Also for the electrodes of the signal sensing units 15 and of the self-test actuation units 17 the capacitive coupling is of a differential type, but is obtained by parallel-plate electrodes, perpendicular to the sensing direction Y.

As illustrated schematically in FIG. 1, in practice the driving mass 7 is coupled to the driving terminals 13a, 13b through driving differential capacitances $C_{D1}$, $C_{D2}$ and to the sensing terminals 14a, 14b through feedback sensing differential capacitances $C_{FBS1}$, $C_{FBS2}$. The sensing mass 8 is instead coupled to the signal sensing terminals 17a, 17b through signal sensing differential capacitances $C_{SS1}$, $C_{SS2}$, and to the self-test terminals 18a, 18b through self-test differential capacitances $C_{ST1}$, $C_{ST2}$. In particular, the self-test actuation electrodes 17a, 17b are shaped in such a way that the sensing mass 8 is subject to an electrostatic actuation force $F_A$ parallel to the sensing direction Y in the presence of a non-zero voltage between the sensing mass 8 itself and the self-test terminals 18a, 18b. In addition, the sensing mass 8 is connected to an excitation terminal 8a for receiving a square-wave excitation signal $V_E$, supplied for example by the driving device 3.

With reference once again to FIG. 1, the driving device 3 is connected to the driving terminals 13a, 13b and to the feedback sensing terminals 14a, 14b of the microstructure 2 so as to form, with the driving mass 7, a microelectromechanical loop 19. The driving device 3 is configured so as to maintain the microelectromechanical loop 19 in oscillation at a driving frequency $\omega_D$ close to the resonant frequency $\omega_R$ of the mechanical system defined by the driving mass 7 (with the sensing mass 8) connected to the fixed structure 6. In addition, the driving device 3 supplies a carrier signal $V_c$ of a frequency equal to the driving frequency $\omega_D$ and in phase with the oscillations of the microelectromechanical loop 19.

The self-test actuator 4 comprises a frequency-divider module 20 and a modulator 21, having outputs connected to the self-test terminals 18a, 18b of the microstructure 2. The self-test actuator 4 is thus capacitively coupled to the sensing mass 8.

The frequency-divider module 20 is coupled to the driving device 3 for receiving the carrier signal $V_C$ and generates a base-band self-test signal $V_{STB}$, for example a sinusoidal or square-wave signal, with a frequency equal to or lower than the driving frequency $\omega_D$. In particular, the base-band self-test signal $V_{STB}$ has a self-test frequency $\omega_{ST}$ equal to $\omega_D/A$ (with A being an integer) and higher than the frequency band of the signals indicating the Coriolis acceleration to which the sensing mass 8 is subject as a result of a rotation about the sensing axis Y. Said frequency band will be hereinafter referred to as Coriolis band BC. Preferably, the self-test frequency $\omega_{ST}$ is equal to one half of the driving frequency $\omega_D$ (A=2) and is of the order of kilohertz (whilst the upper margin of the Coriolis band BC is of the order of tens of hertz).

The modulator 21 has inputs 21a, 21b, respectively connected to the frequency-divider module 20 and to the driving device 3 for receiving the carrier signal $V_C$ and the base-band self-test signal $V_{STB}$. In addition, the modulator 21 generates a modulated self-test signal $V_{STM}$, which is in practice obtained by modulating the carrier signal $V_C$ with the base-band self-test signal $V_{STB}$. The modulation is preferably of the DSB-SC (Double Side Band—Suppressed Carrier) type.

Figure 2:
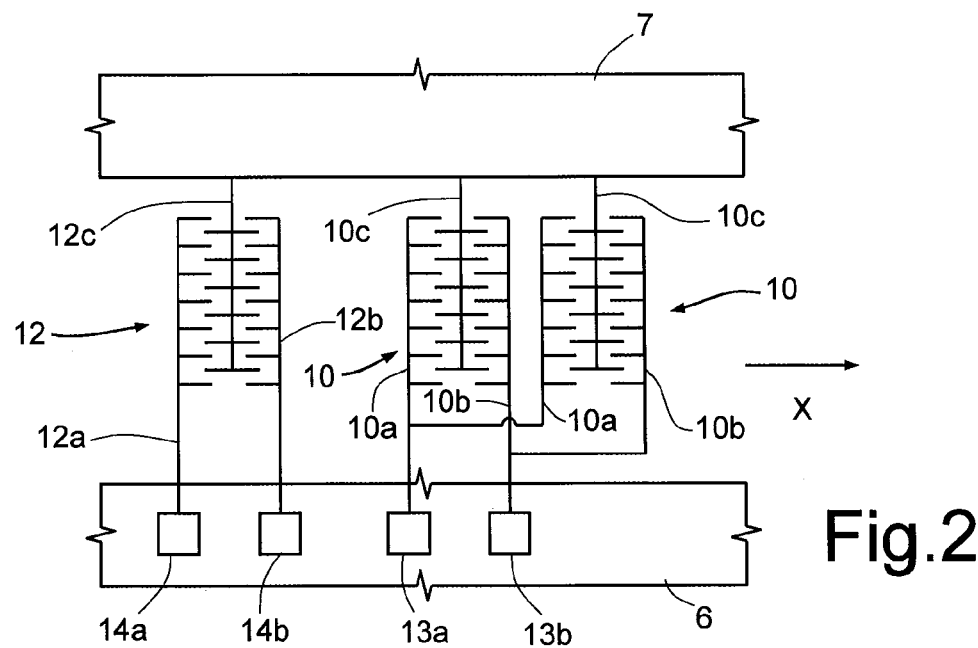
FIG. 2 is a simplified top plan view of an enlarged detail of the device of FIG. 1.

Outputs of the modulator 21 are coupled to the self-test terminals 18a, 18b of the microstructure 2 so that the modulated self-test signal $V_{STM}$ is applied to the self-test actuation units 17 and produces a net electrostatic actuation force $F_A$ that tends to shift the sensing mass 7 according to the sensing axis Y (for example, in the direction indicated in FIG. 2).

The sensing device 5 comprises a read interface 23, a signal branch 24, and a self-test branch 25.

The read interface 23 comprises a charge-to-voltage converter, for example a fully differential charge amplifier, having inputs connected to the signal sensing terminals 16a, 16b of the microstructure 2. The read interface 23 receives from the sensing terminals 16a, 16b of the microstructure 2 electrical sensing signals indicating the displacements of the sensing mass 8 according to the sensing axis Y. The electrical sensing signals can be charge packets $Q_{S1}$, $Q_{S2}$ having a value modulated by the angular velocity $\Omega_C$, as in the embodiment described herein, or else currents or voltages.

The read interface 23 converts the electrical sensing signals (in the example, the charge packets $Q_{S1}$, $Q_{S2}$) into a transduction signal $V_T$, in turn indicating the displacements of the sensing mass 8 according to the sensing axis Y.

The signal branch 24 comprises a signal demodulator 27 and a first low-pass filter 28, which are cascade-connected to the read interface 23. In greater detail, the signal demodulator 27 is coupled to outputs of the read interface 23 for receiving the transduction signal $V_T$. In addition, the signal demodulator 27 has a demodulation input 27a connected to the driving device 3 for receiving the carrier signal $V_C$. The transduction signal $V_T$ is demodulated using the carrier signal $V_C$. A first demodulated signal $V_{D1}$ is thus present on the output of the signal demodulator 27.

The first low-pass filter 28 is connected downstream of the signal demodulator 27 and has a cut-off frequency comprised between approximately the upper margin of the Coriolis band BC and the self-test frequency $\omega_{ST}$. Preferably, the cut-off frequency is close to the upper margin of the Coriolis band BC so as not to jeopardize the signal components produced by the rotation about the sensing axis Y.

The output of the first low-pass filter 28 defines a signal output 1a of the gyroscope 1 and supplies an angular-velocity signal $V_\Omega$ indicating the angular velocity $\Omega$ about the sensing axis Y.

The self-test branch 25 comprises a self-test demodulator 30, a second low-pass filter 31, a comparator 32, and a status register 33, cascade-connected together.

In detail, the self-test demodulator 30 is coupled to the signal demodulator 27, for receiving the first demodulated signal $V_{D1}$, and has a demodulation input 30a connected to the frequency-divider module 20 of the self-test actuator 4, for receiving the base-band self-test signal $V_{STB}$. The self-test demodulator 30, in practice, carries out a further demodulation of the first demodulated signal $V_{D1}$, using the base-band self-test signal $V_{STB}$ as carrier, and thus generates a second demodulated signal $V_{D2}$.

The second low-pass filter 31 is connected downstream of the self-test demodulator 30 and has a cut-off frequency such as to attenuate the harmonic components of the second demodulated signal $V_{D2}$ equal to or higher than the self-test frequency $\omega_{ST}$. In one embodiment, the first low-pass filter 28 and the second low-pass filter 31 have the same cut-off frequency. However, the second low-pass filter 31 has the basic purpose of preserving the DC component of the second demodulated signal $V_{D2}$ and attenuating or eliminating all the higher components. Thus, the cut-off frequency of the second low-pass filter 31 may even be lower than that of the first low-pass filter 28. A DC self-test signal $V_{STC}$ is present on the output of the second low-pass filter 31.

The comparator 32 is coupled to the low-pass filter 31 for receiving the DC self-test signal $V_{STC}$, and to a programmable reference generator 35, which provides a threshold value $V_{TH}$. The comparator 32 supplies a self-test logic signal FST having a first value when the DC self-test signal $V_{STC}$ is greater than the threshold value $V_{TH}$, and a second logic value otherwise.

The status register 33 stores the self-test logic signal FST and makes it available as status flag. In particular, the first logic value of the self-test logic signal FST indicates proper operation of the gyroscope 1, whilst the second logic value indicates malfunctioning.

Operation of the gyroscope 1 is described in what follows.

The driving device 3 acts so as to maintain the microelectromechanical loop 19 in oscillation at the driving frequency $\omega_D$. Consequently, the driving mass 7 and the sensing mass 8 vibrate along the driving axis X about a resting position. When the gyroscope 1 turns about a gyroscopic axis perpendicular to the driving axis X and to the sensing axis Y, the sensing mass 8 oscillates along the sensing axis Y as a result of the Coriolis force. For reasons of simplicity, we shall assume that the gyroscope turns with a constant angular velocity $\Omega_C$ in the Coriolis band BC (without any loss of generality to the ensuing treatment, which applies also in the case of angular velocity variable within the Coriolis band BC). The amplitude of the displacement, which is proportional to the rotation rate about the gyroscopic axis and to the velocity along the driving axis X, is transduced by the read interface 23 and converted into a spectral component of the transduction signal $V_T$. More precisely, from the standpoint of the harmonic content of the transduction signal $V_T$ the effect of the rotation about the gyroscopic axis is that of a carrier signal with driving frequency $\omega_D$ amplitude-modulated by a signal having a frequency equal to the angular velocity $\Omega_C$. As illustrated in FIG. 4a, then, the component of the transduction signal $V_T$ due to rotation about the gyroscopic axis comprises the frequencies $\omega_D \pm \Omega_C$ (more in general, the band $\omega_D \pm BC$ in the case of rotations at variable angular velocity, illustrated here with a dashed line).

Simultaneously, the self-test actuator 4 applies the modulated self-test signal $V_{STM}$ to the self-test electrodes 18a, 18b of the microstructure 2. Thanks to the capacitive coupling with the sensing mass 8, the modulated self-test signal $V_{STM}$ produces an electrostatic actuation force $F_A$ and consequently causes displacements of the sensing mass 8 along the axis Y with actuation frequencies $\omega_D \pm \omega_{ST}$. In normal operating conditions, said displacements are proportional to the amplitude of the modulated self-test signal $V_{STM}$; in effect, they add to the displacements caused by the rotation about the gyroscopic axis and, like these, are transduced by the read interface 23. Consequently, the transduction signal $V_T$ also comprises a component indicating the displacements caused by the self-test actuator 4, even though in a different frequency band with respect to the component due to rotation about the gyroscopic axis. In particular, given that the modulated self-test signal $V_{STM}$ is obtained by DSB-SC modulation of the carrier signal $V_C$ with the base-band self-test signal $V_{STB}$, its spectrum contains the actuation frequencies $\omega_D \pm \omega_{ST}$, which are again encountered also in the spectrum of the transduction signal $V_T$. To sum up, the sensing mass 8 operates as adder of the effects due to the rotation about the gyroscopic axis (which it is desired to measure through the gyroscope 1) and to the modulated self-test signal $V_{STM}$ supplied by the self-test actuator 4, and the transduction signal $V_T$ generated by the read interface 23 contains (but for disturbance) the spectral components $\omega_D \pm \omega_{ST}$ (actuation frequencies) and $\omega_D \pm \Omega_C$ ($\omega_D \pm BC$).

The demodulation performed by the signal demodulator 27 brings the frequency components $\omega_{ST}$ and $\Omega_C$ back into band base, in addition, of course, to introducing frequency components $2\omega_D \pm \omega_{ST}$ and $2\omega_D \pm \Omega_C$ (FIG. 4b; in practice, the spectrum of the first demodulated signal $V_{D1}$ contains the frequencies $\omega_D \pm (\omega_D \pm \omega_{ST})$ and $\omega_D \pm \Omega_C$, or $\omega_D \pm (\omega_D \pm BC)$ in the case of rotations at variable angular velocity).

The first low-pass filter 28 (the transfer function FLP1 of which is illustrated in FIG. 4b) eliminates or in any case attenuates all the spectral components having a frequency higher than the Coriolis band BC, and hence the angular-velocity signal $V_\Omega$ indicates just the angular velocity $\Omega_C$ about the gyroscopic axis.

The self-test demodulator 30 carries out a further demodulation of the first demodulated signal $V_{D1}$ using the base-band self-test signal $V_{STB}$ as carrier. The component of the first demodulated signal $V_{D1}$ at the self-test frequency $\omega_{ST}$ originates a DC component $DC_{ST}$ (FIG. 4c), which is due exclusively to the effect of the modulated self-test signal $V_{STM}$ on the movement of the sensing mass 8 and corresponds (is for example proportional) to the maximum amplitude of the modulated self-test signal $V_{STM}$ itself. The other components of the first demodulated signal $V_{D1}$ introduce higher frequency components into the spectrum of the second demodulated signal $V_{D2}$, among which frequency components $\omega_{ST} \pm \Omega_C$ (further spectral components are not illustrated for reasons of simplicity).

The second low-pass filter 31 (the transfer function FLP2 of which is illustrated in FIG. 4c) eliminates or attenuates all the components with frequency higher than the DC component. The DC self-test signal $V_{STC}$ is hence indicative only of the contribution of the modulated self-test signal $V_{STM}$ and can thus be compared with a threshold value $V_{TH}$, which can possibly be calibrated. As already mentioned, in practice, the effect of the base-band self-test signal $V_{STB}$ is equivalent, as regards the displacements of the sensing mass 8, to a rotation about the gyroscopic axis, but falls within a different frequency band, which the self-test branch 25 makes it possible to isolate and discriminate in order to determine whether the gyroscope 1 is operating properly. If in fact any malfunctioning arises, whether in the micromechanical part or in the associated electronics, the amplitude of the DC self-test signal $V_{STC}$ is reduced with respect to the expected value. The comparator 32 then switches, and the self-test logic signal FST passes to the value indicating a fault, which is immediately identified.

In practice, then, the gyroscope 1 uses a self-test signal (the modulated self-test signal $V_{STM}$) with harmonic content basically in a band distinct from the Coriolis band BC. The effect of the self-test signal can be added to the effect of rotations about the gyroscopic axis through the sensing mass 8. Hence, the signals fetched and transduced by the read interface 23 have spectral components in distinct bands that can be put down either to the rotations about the gyroscopic axis or to the self-test actuation. The reading branch 24 and the self-test branch 25 of the reading device 5 separate the spectral components, in particular isolating the contribution of the self-test actuation. The latter can hence be examined for determining the compatibility with normal operating conditions. In the embodiment described, the separation of the spectral components is obtained effectively by a double demodulation, using first the carrier signal $V_C$ and then the base-band self-test signal $V_{ST}$ as demodulating signals.

The gyroscope 1 described above advantageously enables continuous exploitation of the self-test functions, irrespective of the operating conditions. In particular, the self-test can be conducted even when the gyroscope 1 is not at rest, and it is not necessary to suspend the operations of measurement of the angular velocity, because the self-test actuator 4 and the self-test branch 25 of the sensing device 5 enable discrimination, in the spectrum of the signal transduced by the read interface 23, of the effect of the self-test signal applied to the sensing mass 8. In addition, using a very selective low-pass filter for isolating the DC component, it is possible to apply self-test signals of reduced amplitude, which practically have no effect as regards sensing of the angular velocity (in other words, the dynamics of the read interface 23 is almost entirely available for detection of the angular-velocity signal, and the self-test signals have an altogether negligible effect on the signal-to-noise ratio).

Figure 5:
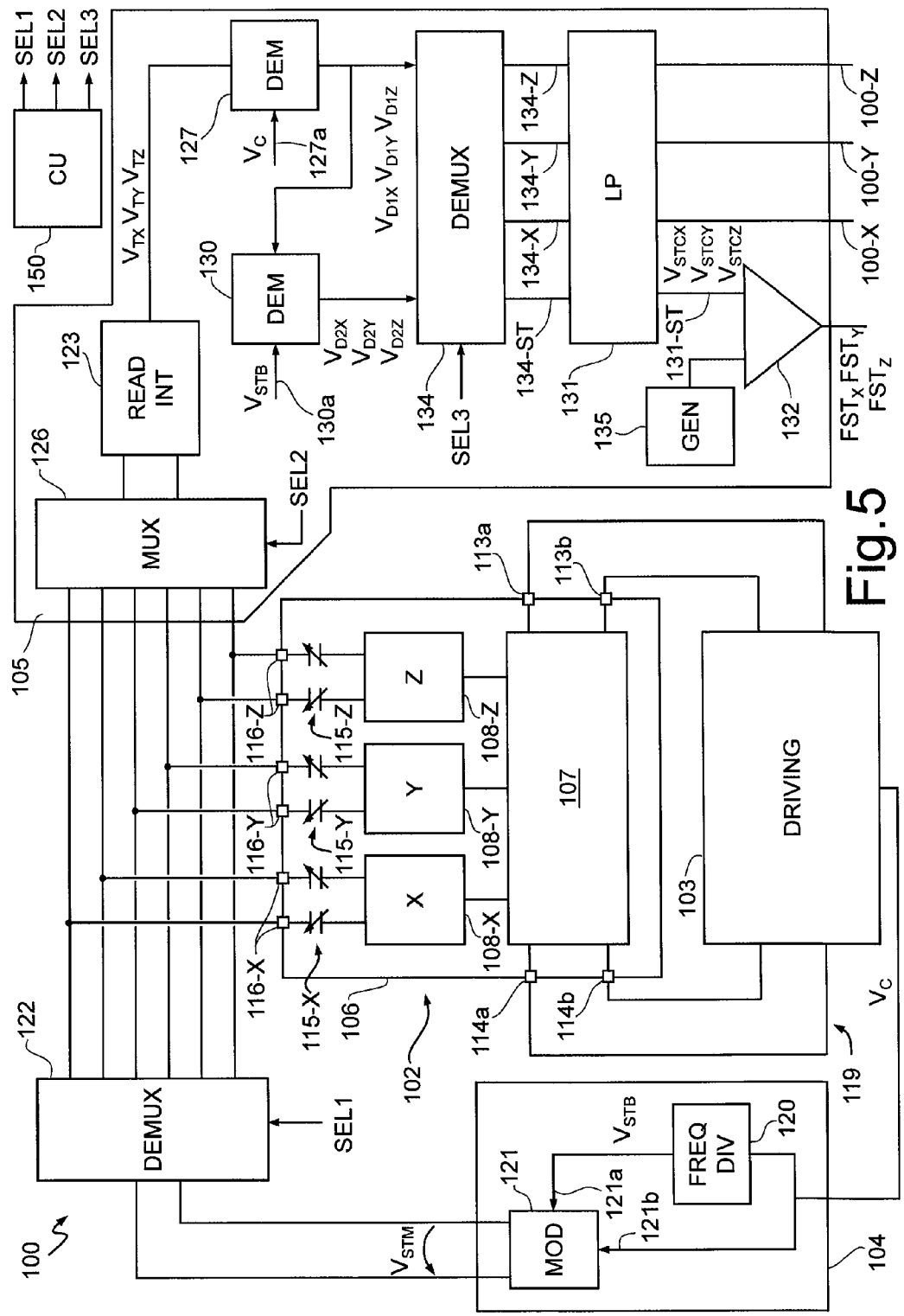
FIG. 5 is a simplified block diagram of a microelectromechanical gyroscope in accordance with a second embodiment of the present invention.

FIG. 5 illustrates a triaxial gyroscope 100 in accordance with a different embodiment of the invention. The gyroscope 100 comprises a microstructure 102, a driving device 103, a self-test actuator 104, a sensing device 105, and a control unit 150.

The microstructure 102 is, for example, of the type described in detail in the published European patent application No. EP-A-1 832 841 and in the corresponding U.S. Pat. No. 7,694,563 and comprises a fixed structure 106, a driving mass 107, and three sensing-mass systems 108-X, 108-Y, 108-Z. In FIG. 5, however, the microstructure 102 is represented only schematically, for reasons of simplicity.

The driving mass 107 is elastically connected through suspensions (not shown) to the fixed structure 106 so as to oscillate in a plane XY about a resting position according to a degree of freedom, in this case rotational. The sensing masses 108-X, 108-Y, 108-Z are mechanically coupled to the driving mass 107 so as to be driven in motion according to the rotational degree of freedom of the driving mass 107 itself. In addition, the sensing masses 108-X, 108-Y, 108-Z are elastically connected to the driving mass 107 so as to oscillate in turn with respect to the driving mass 107 itself, with respective further translational or rotational degrees of freedom, in response to rotations of the microstructure 102 about respective mutually perpendicular sensing axes X, Y, Z.

The sensing masses 108-X, 108-Y, 108-Z are capacitively differentially coupled to the fixed structure 106 through respective sets of sensing electrodes 115-X, 115-Y, 115-Z (here not shown individually and illustrated schematically as capacitors), which are connected to respective pairs of signal sensing terminals 116-X, 116-Y, 116-Z. The sets of sensing electrodes 115-X, 115-Y, 115-Z are shaped in such a way that, in the presence of an electrical signal on the signal sensing terminals 116-X, 116-Y, 116-Z, the corresponding sensing masses 108-X, 108-Y, 108-Z are subject to electrostatic forces according to the respective degrees of freedom.

The driving device 103 is connected to the microstructure 102 so as to form, with the driving mass 107, a microelectromechanical loop 119. The driving device 103 is configured so as to maintain the microelectromechanical loop 119 in oscillation at a driving frequency $\omega_D$ close to the resonant frequency $\omega_R$ of the mechanical system defined by the driving mass 107 (with the sensing mass 108) connected to the fixed structure 106. In addition, the driving device 103 supplies a carrier signal $V_C$ with a frequency equal to the driving frequency $\omega_D$ and in phase with the oscillations of the microelectromechanical loop 119.

The self-test actuator 104 comprises a frequency divider 120 and a modulator 121, substantially as already described with reference to FIG. 1, and, moreover, a first demultiplexer 122, which is controlled by a first selection signal SEL1 generated by a control unit 150. In particular, the frequency-divider module 120 generates a base-band self-test signal $V_{STB}$, for example a sinusoidal or square-wave signal, with a frequency equal to or lower than the driving frequency $\omega_D$, starting from the carrier signal $V_C$. The modulator 121 generates a modulated self-test signal $V_{STM}$ that is obtained by modulating the carrier signal $V_C$ with the band-base self-test signal $V_{STB}$. In this case, the modulated self-test signal $V_{STM}$ is supplied on outputs of the modulator 121 that are selectively connectable, through the first demultiplexer 122, to the signal sensing terminals 116-X, 116-Y, 116-Z of the microstructure 102. The first demultiplexer 122 is moreover configured so as to decouple in a controlled way the modulator 121 from the signal sensing terminals 116-X, 116-Y, 116-Z during sensing steps of each read cycle of the gyroscope 100 while the sensing circuit 105 is connected to the signal sensing terminals 116-X, 116-Y, 116-Z. For example, the modulator 121 may be provided with a floating output or else an enable output that enables setting of the outputs in a high-impedance state.

The sensing device 105 comprises a multiplexer 126, a read interface 123, a signal demodulator 127, a self-test demodulator 130, a low-pass filter 131, a comparator 132, a second demultiplexer 134, and a status register 133.

The read interface 123 is selectively connectable in succession to the signal sensing terminals 116-X, 116-Y, 116-Z through the multiplexer 126, which is controlled by a second selection signal SEL2. In addition, the multiplexer 126 is configured so as to decouple the read interface 123 from the signal sensing terminals 116-X, 116-Y, 116-Z through the multiplexer 126 during self-test steps of each read cycle of the gyroscope 100, where the signal sensing terminals 116-X, 116-Y, 116-Z receive the modulated self-test signal $V_{STM}$. When connected, the read interface 23 receives from the signal sensing terminals 116-X, 116-Y, 116-Z electrical sensing signals (charge packets in the embodiment described) and converts them into respective transduction signals $V_{TX}$, $V_{TY}$, $V_{TZ}$.

The signal demodulator 127 receives in cyclic succession the transduction signals $V_{TX}$, $V_{TY}$, $V_{TZ}$ from the read interface 123. In addition, a demodulation input 127a of the signal demodulator 127 is connected to the driving device 3 for receiving the carrier signal $V_C$. The transduction signals $V_{TX}$, $V_{TY}$, $V_{TZ}$ are demodulated using the carrier signal $V_C$. On the output of the signal demodulator 27 there are hence cyclically present first demodulated signals $V_{D1X}$, $V_{D1Y}$, $V_{D1Z}$ (in other words, the signal present on the output of the signal demodulator 127 cyclically represents the movements of the sensing masses 108-X, 108-Y, 108, which are all due to rotations about the axes X, Y, Z and to self-test actuation).

The self-test demodulator 130 is coupled to the signal demodulator 127, for receiving the first demodulated signals $V_{D1X}$, $V_{D1Y}$, $V_{D1Z}$ cyclically and has a demodulation input 130a connected to the frequency-divider module 120 for receiving the base-band self-test signal $V_{STB}$. The self-test demodulator 130 carries out a further demodulation of the first demodulated signals $V_{D1X}$, $V_{D1Y}$, $V_{D1Z}$ using the base-band self-test signal $V_{STB}$ as carrier and thus generates cyclically second demodulated signals $V_{D2X}$, $V_{D2Y}$, $V_{D2Z}$.

The second demultiplexer 134, which is controlled by a third selection signal SEL3, receives the first demodulated signals $V_{D1X}$, $V_{D1Y}$, $V_{D1Z}$ from the signal demodulator 127 and forwards them on respective signal output lines 134-X, 134-Y, 134-Z. In addition, the second demultiplexer 134 receives the second demodulated signals $V_{D2X}$, $V_{D2Y}$, $V_{D2Z}$ from the self-test demodulator 130 and forwards them on a self-test output line 134-ST.

The low-pass filter 131 has a plurality of filtering lines, connected to a respective one between the signal output lines 134-X, 134-Y, 134-Z and the self-test output line 134-ST. The cut-off frequency of the low-pass filter 131 is comprised between approximately the upper margin of the Coriolis band BC and the self-test frequency $\omega_{ST}$. Signal outputs of the low-pass filter 131 (in particular, the outputs corresponding to the signal output lines 134-X, 134-Y, 134-Z of the second demultiplexer 134) define respective signal outputs 100-X, 100-Y, 100-Z of the gyroscope 100 and supply angular-velocity signals $V_{\Omega X}$, $V_{\Omega Y}$, $V_{\Omega Z}$ that indicate angular velocities $\omega_X$, $\omega_Y$, $\omega_Z$ about the sensing axes X, Y, X, respectively.

A self-test output 131-ST of the low-pass filter 131, corresponding to the self-test output line 134-ST of the second demultiplexer 134, cyclically supplies DC self-test signals $V_{STCX}$, $V_{STCY}$, $V_{STCZ}$.

The comparator 131 is coupled to the self-test output 131-ST of the low-pass filter 131, for receiving the DC self-test signals $V_{STCX}$, $V_{STCY}$, $V_{STCZ}$, and to a programmable reference generator 135, which yields a threshold value $V_{TH}$. The comparator 131 supplies self-test logic signals $FST_X$, $FST_Y$, $FST_Z$, having a first value, when the corresponding DC self-test signal $V_{STCX}$, $V_{STCY}$, $V_{STCZ}$ is higher than the threshold value $V_{TH}$, and a second logic value otherwise. The self-test logic signals $FST_X$, $FST_Y$, $FST_Z$ are indicative of proper operation of the gyroscope 100 each as regards a respective one of the sensing axes X, Y, Z. In one embodiment (not illustrated), distinct threshold values are used for the different sensing axes.

The self-test logic signals $FST_X$, $FST_Y$, $FST_Z$ may be made available as status flags in a register (not shown).

The working principle of the gyroscope 100 is similar to what has already been described for the gyroscope 1, with the difference that, in the gyroscope 100, the self-testing function is provided on each sensing axis X, Y, Z using the time-division signal sensing terminals.

In practice, each read cycle $T_R$ (FIG. 6) of the gyroscope 100 is divided into three sensing intervals $T_X$, $T_Y$, $T_Z$, each dedicated to reading according to a respective one of the sensing axes X, Y, Z. The sensing intervals $T_X$, $T_Y$, $T_Z$ each comprise a sensing step $T_{SX}$, $T_{SY}$, $T_{SZ}$ and a self-test step $T_{STX}$, $T_{STY}$, $T_{STZ}$. In the sensing steps $T_{SX}$, $T_{SY}$, $T_{SZ}$ dedicated to reading of the respective sensing axis X, Y, Z, the signal sensing terminals 116-X, 116-Y, 116-Z of the sensing-mass systems 108-X, 108-Y, 108-Z are selectively coupled to the sensing device 105 through the multiplexer 126 (not shown in FIG. 6). In each self-test step $T_{STX}$, $T_{STY}$, $T_{STZ}$, instead, the modulated self-test signal $V_{STM}$ is applied to the signal sensing terminals 116-X, 116-Y, 116-Z involved through the first demultiplexer 122 (not shown in FIG. 6).

As has been mentioned previously, the modulated self-test signal $V_{STM}$ is generated by the modulation of the carrier signal $V_C$ with the base-band self-test signal $V_{ST}$. Each sensing-mass system 108-X, 108-Y, 108-Z sums up the contribution due to displacements caused by the self-test device 104 and the contribution due to rotation of the gyroscope 100 about the respective sensing axis X, Y, Z. The latter present as carrier signals with frequency $\omega_D$ modulated by angular velocities $\Omega_X$, $\Omega_Y$, $\Omega_Z$, respectively, about the sensing axes X, Y, Z. The transduction signals $V_{TX}$, $V_{TY}$, $V_{TZ}$ supplied in sequence by the read interface 123 hence contain the spectral components $\omega_D \pm \omega_{ST}$ (actuation frequencies, due to the movements of the sensing masses 108-X, 108-Y, 108-Z as a result of the modulated self-test signal $V_{STM}$) and $\omega_D \pm BC$ (due to rotation of the gyroscope 100). The signal demodulator 127, as already described, introduces into baseband the frequency components $\omega_{ST}$ and $\Omega_C$, whereas the self-test demodulator 130 introduces a DC component that is due exclusively to the effect of the self-test actuation on the movement of the sensing-mass systems 108-X, 108-Y, 108-Z and corresponds to the maximum amplitude of the modulated self-test signal $V_{STM}$.

The low-pass filter 131 eliminates the components with frequency higher than the self-test frequency $\omega_D$ so that at output the angular-velocity signals $V_{\Omega X}$, $V_{\Omega Y}$, $V_{\Omega Z}$ are defined only by the components in the Coriolis band BC, and the DC self-test signals $V_{STCX}$, $V_{STCY}$, $V_{STCZ}$ have substantially only DC components.

Finally, the DC self-test signals $V_{STCX}$, $V_{STCY}$, $V_{STCZ}$ are compared with respective threshold values by the comparator 131 to generate the self-test logic signals $FST_X$, $FST_Y$, $FST_Z$.

In addition to the advantages already referred to, regarding the possibility of performing self-testing continuously and in any condition of operation of the gyroscope, both the microstructure and the sensing device are simplified. In fact, the microstructure 102 does not require dedicated self-test terminals and is hence simpler to design and build and is less subject to possible failures. The sensing device 105 is instead provided with just one low-pass filter.

Figure 6:
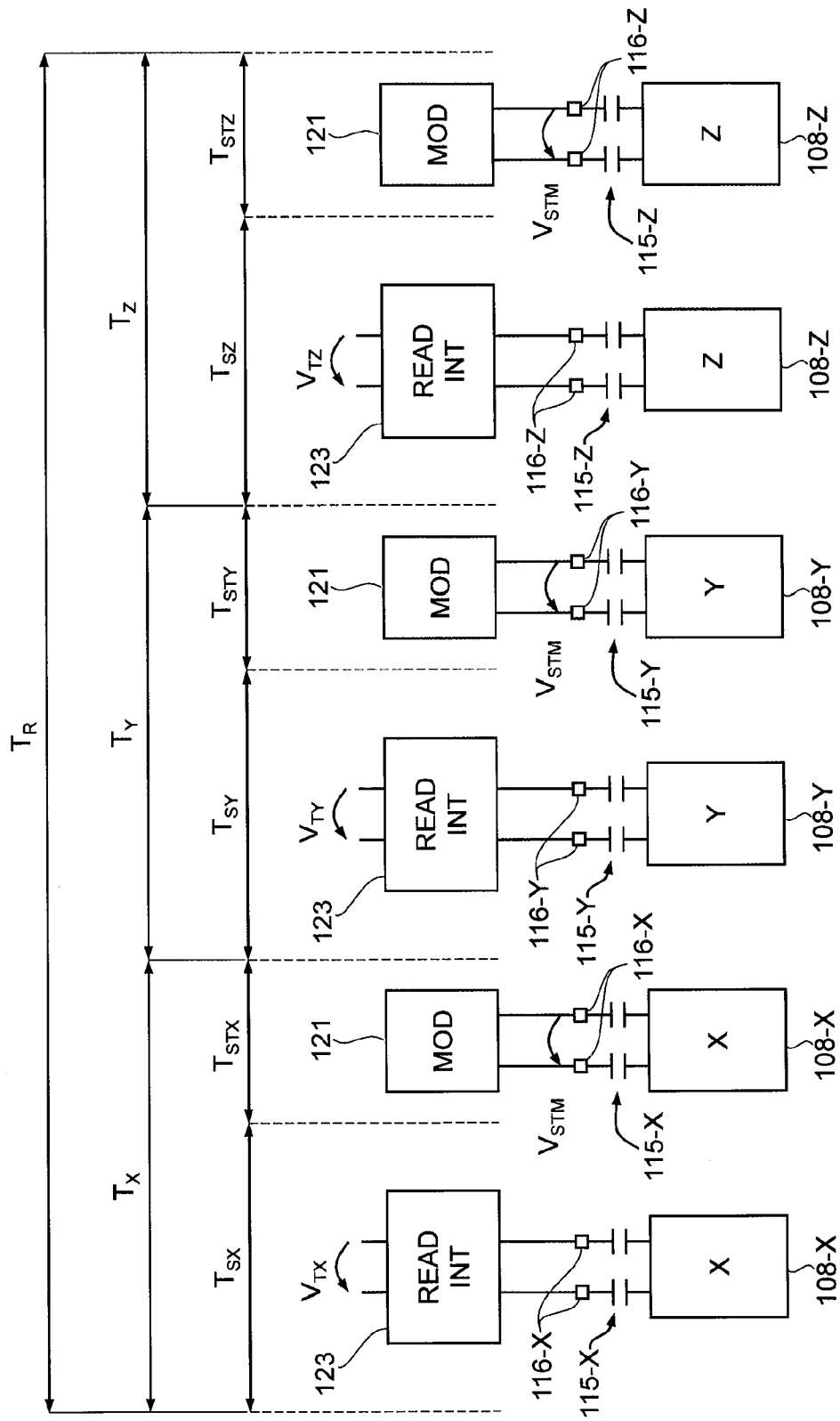
FIG. 6 shows time plots regarding parts of the gyroscope of FIG. 5 in different operating configurations.

According to the embodiment of FIG. 6, the operation of the gyroscope 100 is divided into three sensing intervals $T_X$, $T_Y$, $T_Z$, each dedicated to operation of a respective one of the sensing masses 108-X, 108-Y, 108-Z, and each divided into a respective sensing step and self-test step. According to an alternative embodiment, the sensing step $T_S$ corresponding to each of the sensing masses overlaps, at least partially, with the self-test step $T_{ST}$ of another of the sensing masses. Illustrated in FIG. 7 is a portion of an electronic system 200 in accordance with one embodiment of the present invention. The system 200 incorporates the gyroscope 1 and may be used in devices, such as, for example, a palm-top computer (personal digital assistant, PDA), a laptop or portable computer, possibly with wireless capacity, a cell phone, a messaging device, a digital music player, a digital camera, or other devices designed to process, store, transmit or receive information.

For example, the gyroscope 1 may be used in a digital camera for detecting movements and performing an image stabilization. In other embodiments, the gyroscope 1 is included in a portable computer, a PDA, or a cell phone for detecting a free-fall condition and activating a safety configuration. In a further embodiment, the gyroscope 1 is included in a motion-activated user interface for computers or video-game consoles. In a further embodiment, the gyroscope 1 is incorporated in a satellite-navigation device and is used for temporary position tracking in the event of loss of the satellite-positioning signal.

The electronic system 200 can comprise a controller 210, an input/output (I/O) device 220 (for example, a keyboard or a display), the gyroscope 1, a wireless interface 240, and a memory 260, of a volatile or nonvolatile type, coupled to one another through a bus 250. In one embodiment, a battery 280 may be used for supplying the system 200. It should be noted that the scope of the present invention is not limited to embodiments having necessarily one or all of the devices listed.

The controller 210 can comprise, for example, one or more microprocessors, microcontrollers and the like.

The I/O device 220 may be used for generating a message. The system 200 can use the wireless interface 240 for transmitting and receiving messages to and from a wireless communications network with a radiofrequency signal (RF). Examples of wireless interface can comprise an antenna, a wireless transceiver, such as a dipole antenna, even though the scope of the present invention is not limited from this standpoint. In addition, the I/O device 220 can supply a voltage representing what is stored either in the form of digital output (if digital information has been stored) or in the form of analog information (if analog information has been stored).

Finally, it is evident that modifications and variations may be made to the method and to the device described, without departing from the scope of the present invention, as defined in the annexed claims.

In the first place, the discrimination in frequency of the self-test signals may be used for testing proper functionality of gyroscopes with any microelectromechanical structure that are based upon detection of Coriolis forces.

The discrimination of the spectral component due to the self-test actuation may be conducted directly by the signals coming from the signal demodulator or even directly by the read interface. In this case, a selective pass-band filter may be used, centered, for example, around the frequency $2\omega_D - \omega_{ST}$ for the signals coming from the signal demodulator, or else around the frequency $\omega_D - \omega_{ST}$ for the signals coming from the read interface.

Furthermore, the embodiments described above can be combined to provide further embodiments. For example, according to an embodiment, in a microelectromechanical device configured to detect rotation about a single sensing axis, similar to the gyroscope 1 described with reference to FIGS. 1-4, a modulator and a read interface can be cyclically coupled to a sensing mass via a multiplexer and a single capacitive coupling, as described with reference to the gyroscope 100 of FIGS. 5 and 6. According to another embodiment, in a multi-axial gyroscope, such as, e.g., the device 100, each sensing mass can be provided with a respective self test actuator and a respective sensing device, substantially as described with reference to the device 1.

According to an embodiment, the electronic system 200 described with reference to FIG. 7 can be provided with a multi-axial device in place of the gyroscope 1. As used herein, the symbol "±" means "plus and minus." Thus, for example, the phrase "the frequencies $\omega_D \pm \omega_{ST}$" can be interpreted as referring inclusively to the frequency $\omega_D + \omega_{ST}$ and the frequency $\omega_D - \omega_{ST}$.

All of the U.S. patents, U.S. patent application publications, U.S. patent application, foreign patents, foreign patent application and non-patent publications referred to in this specification are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical gyroscope comprising:
a driving mass configured to be driven with a driving frequency during a normal operating state;
a sensing mass, elastically coupled to the driving mass and movable with respect to the driving mass according to a degree of freedom in response to rotations of the gyroscope about a sensing axis, the sensing mass including:
a first mobile electrode; and
a second mobile electrode;
a continuous self-test actuator configured to produce a self-test signal during the normal operating state and during a rest state, the self-test actuator including:
a first fixed electrode capacitively coupled to the first mobile electrode to couple the self-test actuator to the sensing mass, the first fixed electrode being configured to apply, in response to the self-test signal from the self-test actuator, electrostatic forces to move the sensing mass in accordance with the degree of freedom and at a self-test actuation frequency; and
a sensing device that includes a second fixed electrode capacitively coupled to the second mobile electrode, the second fixed electrode being configured to sense transduction signals indicative of displacements of the sensing mass according to the degree of freedom, the sensing device being configured to discriminate, in the transduction signals, spectral components corresponding to the rotations of the gyroscope about the sensing axis from spectral components corresponding to the self-test actuation frequency, the spectral components being indicative of motion of the sensing mass caused by the self-test signal, the sensing device including:
a first demodulator chain configured to receive the transduction signals; and
a second demodulator chain configured to receive a first demodulated signal from the first demodulator chain.

2. The gyroscope of claim 1 wherein the second demodulator chain is configured to receive the self-test signal.

3. The gyroscope of claim 2 wherein the first demodulator chain includes a first low pass filter that is configured to receive the first demodulated signal and the second demodulator chain includes a second low pass filter that is configured to receive a second demodulated signal.

4. The gyroscope of claim 1 wherein the self-test actuation frequency is equal to or lower than the driving frequency.

5. A device, comprising:
a driving assembly that includes:
a driving mass; and driving circuitry configured to drive the driving mass with a driving frequency in a normal operating condition;
a sensing mass configured to be moved by the driving mass, the sensing mass including:
  a first mobile electrode; and
  a second mobile electrode;
self-test circuitry coupled to the sensing mass, the self-test circuitry being configured to continuously operate in the normal operating condition and in a rest condition, the self-test circuitry including:
  a first fixed electrode capacitively coupled to the first mobile electrode and configured to apply a self-test signal to the sensing mass while the device is in the normal operating condition and to apply the self-test signal while the device is in the rest condition;
  a second fixed electrode capacitively coupled to the second mobile electrode and configured to receive an output signal from the sensing mass and to identify a first portion of the output signal associated with the self-test signal and a second portion of the output signal associated with a rotation of the device about a sensing axis;
  a first demodulator chain configured to receive the output signal from the sensing mass; and
  a second demodulator chain coupled to the first demodulator chain, the second demodulator chain being configured to receive the self-test signal.

6. The device of claim 5 wherein the first demodulator chain is configured to output the second portion of the output signal and the second demodulator chain is configured to output the first portion of the output signal.

7. The device of claim 5 wherein the first demodulator chain includes a first demodulator and a first low pass filter and the second demodulator chain includes a second demodulator and a second low pass filter, the second demodulator being configured to receive the self-test signal.

8. The device of claim 7 wherein the second demodulator chain includes a programmable reference generator and a comparator, the second low pass filter and the programmable reference generator are coupled to the comparator.

9. A method, comprising:
  driving a driving mass at a driving frequency during a normal operating condition;
  moving a sensing mass with the driving mass;
  performing a continuous self-test function, the performing including:
    applying a self-test signal to the sensing mass during the normal operating condition through a first pair of capacitively coupled comb-finger electrodes;
    applying the self-test signal to the sensing mass during a rest condition through the first pair of capacitively coupled comb-finger electrodes;
    receiving an output signal from the sensing mass through a second pair of capacitively coupled comb-finger electrodes; and
    discriminating a first portion of the output signal associated with the self-test signal and a second portion of the output signal associated with a rotation of the device about a sensing axis, the discriminating including:
      demodulating the output signal and outputting a first demodulated signal;
      demodulating the first demodulated signal and outputting a second demodulated signal;
      filtering the second demodulated signal and outputting a filtered demodulated signal; and
      comparing the filtered demodulated signal with a reference signal and outputting the first portion of the output signal.

10. The method of claim 9 wherein the discriminating includes:
  filtering the first demodulated signal and outputting the second portion of the output signal.

11. The method of claim 9 wherein demodulating the first demodulated signal includes receiving the self-test signal.

12. The method of claim 9 wherein the driving includes capacitively coupling a fixed driving electrode to a movable electrode of the driving mass.

13. The method of claim 12 wherein the applying of the self-test signal through the first pair of capacitively coupled comb-finger electrodes includes capacitively coupling a first fixed electrode of a self-test actuator to a first movable electrode of the sensing mass.

14. The method of claim 13 wherein the receiving the output signal through the second pair of capacitively coupled comb-finger electrodes includes capacitively coupling a second movable electrode of the sensing mass to a second fixed electrode of a sensing device.

* * * * *